US007260043B2

(12) United States Patent
Kamon et al.

(10) Patent No.: US 7,260,043 B2
(45) Date of Patent: *Aug. 21, 2007

(54) RECORDING/REPRODUCING APPARATUS, AND METHOD OF DETECTING STATE THEREOF

(75) Inventors: Hidekazu Kamon, Kanagawa (JP); Eiji Tadokoro, Chiba (JP)

(73) Assignee: Sony Corporation, Tokyo (JP)

( * ) Notice: Subject to any disclaimer, the term of this patent is extended or adjusted under 35 U.S.C. 154(b) by 342 days.

This patent is subject to a terminal disclaimer.

(21) Appl. No.: 10/935,184

(22) Filed: Sep. 8, 2004

(65) Prior Publication Data

US 2005/0030868 A1 Feb. 10, 2005

Related U.S. Application Data

(63) Continuation of application No. 09/974,905, filed on Oct. 12, 2001, now Pat. No. 6,836,455.

(30) Foreign Application Priority Data

Oct. 18, 2000 (JP) ............................. 2000-317632
Sep. 14, 2001 (JP) ............................. 2001-280567

(51) Int. Cl.
*G11B 33/14* (2006.01)
(52) U.S. Cl. ................. 369/53.26; 369/53.37; 369/116; 372/25; 372/31
(58) Field of Classification Search ............. 369/53.26, 369/116, 53.37; 372/29.015, 25, 31, 57
See application file for complete search history.

(56) References Cited

U.S. PATENT DOCUMENTS 4,747,091 A * 5/1988 Doi ........................... 369/116
5,334,826 A * 8/1994 Sato et al. ............. 372/29.015
5,383,208 A 1/1995 Queniat et al. ........ 372/29.014
5,506,826 A * 4/1996 Kobayashi ............... 369/53.26
5,625,616 A 4/1997 Koike et al. ............. 369/53.26
5,844,928 A 12/1998 Shastri et al. ............ 372/38.02
6,836,455 B2 * 12/2004 Kamon et al. ........... 369/53.26

* cited by examiner

*Primary Examiner*—Andrea Wellington
*Assistant Examiner*—Kim-Kwok Chu
(74) *Attorney, Agent, or Firm*—Oblon, Spivak, McClelland, Maier & Neustadt, P.C.

(57) ABSTRACT

A data recording/reproducing apparatus wherein various data to be used for maintenance are measured, and parameters required for analysis of the maintenance data are prerecorded to realize prediction of the service life of a semiconductor laser and detection of occurrence of any trouble that may be derived therefrom. In this apparatus where data are recorded in and/or reproduced from a recording medium, the internal state of the apparatus is measured, then any abnormal state in the apparatus is detected on the basis of abnormal state decision data, and the detected state is transmitted to an external information processor. The apparatus comprises a means for measuring first data relative to the apparatus; a first memory means for storing second data to make a decision as to an abnormal state of the measured first data; a means for generating third data relative to maintenance of the apparatus on the basis of the first and second data; and an output means for delivering the third data as an output.

11 Claims, 15 Drawing Sheets

FIG. 3

| ADDRESS | |
|---|---|
| 00 | TEMPERATURE 25°C SETTING |
| 01 | LASER POWER SETTING |
| 05 | SERVO SETTING |
| 11 | SERVO PARAMETER |
| 15 | LASER CURRENT-VOLTAGE CONVERSION VALUE SETTING |
| 16 | RESERVED |
| 20 | SERVO PARAMETER |
| 2C | RESERVED |
| 30 | SERVO PARAMETER |
| 62 | RESERVED |
| 68 | SERVO PARAMETER |
| A1 | RESERVED |
| A6 | SERVO PARAMETER |
| B0 | FREE AREA |

| | |
|---|---|
| D6 | FREE AREA |
| D9 | LASER CURRENT ADJUST VALUE SETTING |
| DD | ACCUMULATED TIME |
| F7 | CONTENTS CONTROL DATA AREA |
| FF | IEEE1394 AREA |

RECORDING/REPRODUCING APPARATUS, AND METHOD OF DETECTING STATE THEREOF

BACKGROUND OF THE INVENTION

The present invention relates to a recording/reproducing apparatus and a method of detecting the state of such a apparatus by first measuring the internal state thereof, then detecting any fault or trouble state on the basis of trouble decision data, and transmitting the result of such detection to an external device.

There is known the technology of recording various data inclusive of music data in a removable disk and storing such data therein. For example, the removable disks may be a magnetic disk such as floppy disk, an optical disk such as CD (compact disk) or DVD (digital versatile disk), a magneto-optical disk such as MO (magneto-optical) disk or MD (mini disk), or a semiconductor memory.

An MD drive for recording data in and/or reproducing the same from an MD is incorporated in an MD component stereo, or is connected to a personal computer or the like for use, or is employed in a music distribution system or the like where the drive is supplied with contents data distributed from a host computer via a network.

Since a removable disk recording/reproducing apparatus such as an MD drive has a complicated internal structure, it is not furnished with technology of detecting any abnormal state or predicting the service life of its component part until occurrence of some trouble observable obviously from outside, and in most cases the cause of any induced trouble is not recognizable by a user.

In an MD drive, an optical block for recording contents data in an MD is equipped with a laser diode. It has been general heretofore that the service life of a laser diode in particular is hardly predictable as it is rendered remarkably different depending on the frequency of use or environment of installation. For this reason, it is customary in most cases that the user inquires of a maintenance center, for example, of the MD drive manufacturer after actual occurrence of any problem in the recording or reproduction of data upon expiration of the service life of the laser diode, and then the necessary action of replacing the part or the like is carried out.

Therefore, in order to prevent depreciation of the reliability in recording the contents data by a semiconductor laser, there is no other remedy, in view of ensuring safety in the present circumstances, than replacement of the semiconductor laser in a stage earlier than expiration of the actual service life thereof, hence raising another problem that increases the cost of the component parts.

SUMMARY OF THE INVENTION

It is therefore an object of the present invention to provide improvements in a data recording/reproducing apparatus such as an MD drive for example, wherein various data to be used for maintenance are measured, and parameters required for analysis of the maintenance data are recorded previously in the MD drive so as to realize prediction of the service life of a semiconductor laser and detection of occurrence of any trouble that may be derived therefrom. In the data recording/reproducing apparatus of the present invention where data are recorded in and reproduced from a recording medium, the internal state of the apparatus is measured, and any abnormal state in the apparatus is detected on the basis of abnormal state decision data, and then the detected state is transmitted to an external device.

According to a one aspect of the present invention, there is provided a recording/reproducing apparatus for recording data in a recording medium and/or reproducing the recorded data therefrom. The apparatus comprises a means for measuring first data relative to the recording/reproducing apparatus; a first memory means for storing second data to make a decision as to an abnormal state of the measured first data; a means for generating third data relative to maintenance of the recording/reproducing apparatus on the basis of the first and second data; and an output means for delivering the third data as an output.

According to another aspect of the present invention, there is provided a method of detecting the internal state of a recording/reproducing apparatus which records data in a recording medium and/or reproduces the data therefrom. The method comprises the steps of measuring, as first data, the internal state of the recording/reproducing apparatus; acquiring second data from a memory for detecting that the first data indicate an abnormal value; generating, from the first and second data, third data relative to maintenance of the recording/reproducing apparatus; and delivering the third data as an output from the recording/reproducing apparatus.

And according to a further aspect of the present invention, there is provided a recording/reproducing apparatus for recording data in a recording medium and/or reproducing the recorded data therefrom. This apparatus comprises a means for measuring first data that indicate the state of the recording/reproducing apparatus; a first memory means for storing second data to make a decision as to any abnormal state of the recording/reproducing apparatus; and an output means for delivering the first and second data as an output to another information processor.

The above and other features and advantages of the present invention will become apparent from the following description which will be given with reference to the illustrative accompanying drawings.

BRIEF DESCRIPTION OF THE DRAWINGS

FIG. 3 is a diagram for explaining data to be recorded in an EEPROM;

DESCRIPTION OF THE PREFERRED EMBODIMENTS

Hereinafter some preferred embodiments of the present invention will be described in detail with reference to the accompanying drawings.

Figure 1:
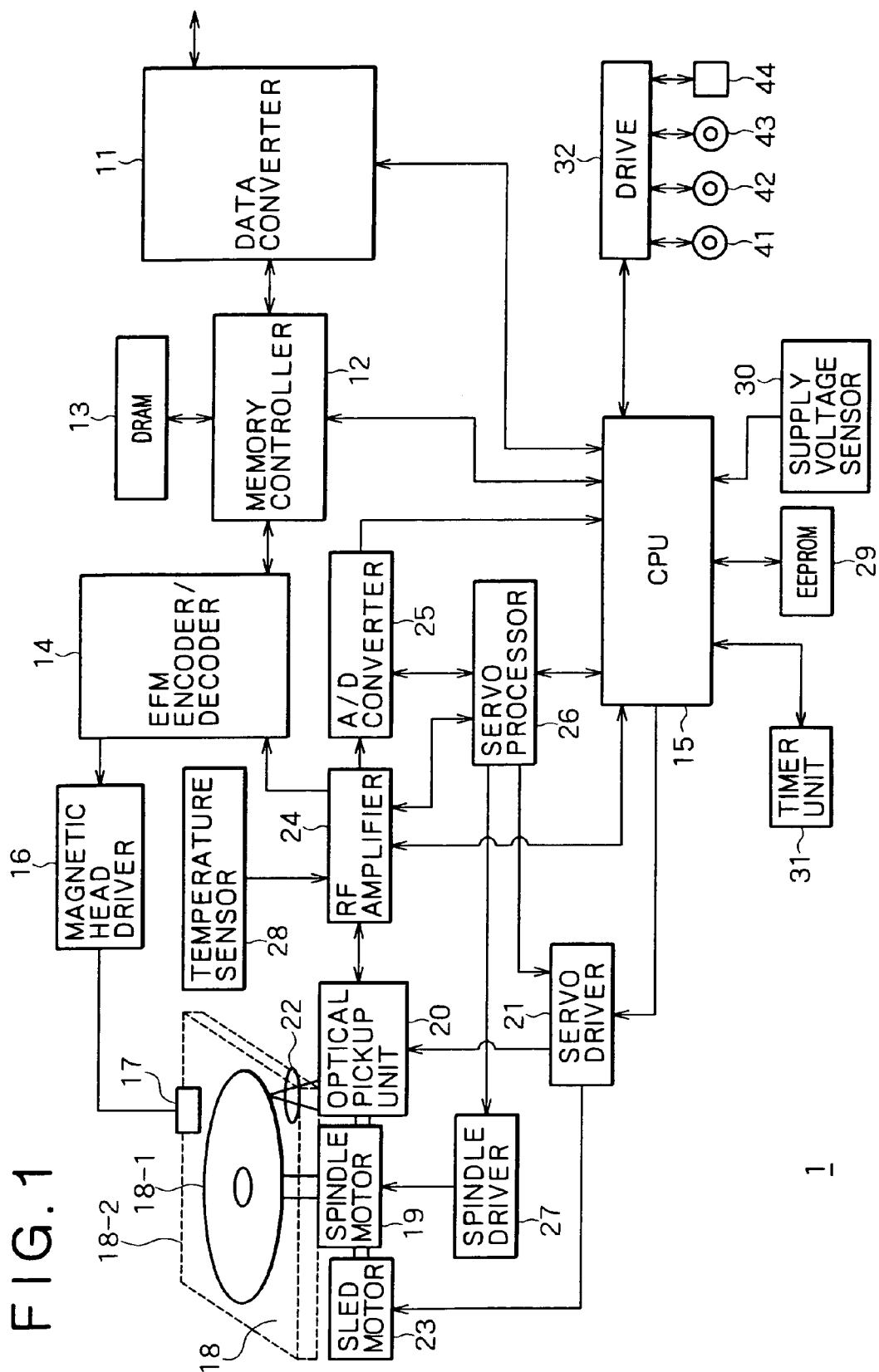
FIG. 1 is a block diagram showing a structural example of an MD drive.

FIG. 1 is a block diagram showing a structural example of an MD drive 1.

Encoded data processed through ATRAC (advanced transform acoustic coding) are inputted to a data converter 11, where a header thereof is separated and the data are converted into a predetermined format recordable in a disk 18-1. And out of the entire data thus converted, contents data to be recorded in the disk 18-1 are outputted to and stored in a DRAM (dynamic random access memory) 13 under control of a memory controller 12, and various control information are outputted to a CPU (central processing unit) 15.

The memory controller 12 reads out the data from the DRAM 13 at predetermined timing, and then outputs the same to an EFM (eight to fourteen modulation) encoder/decoder 14. Subsequently the EFM encoder/decoder 14 executes EFM modulation of the input data and then outputs the modulated data to a magnetic head driver 16. Thereafter the magnetic head driver 16 drives a magnetic head 17, which is disposed opposite to an optical pickup unit 20, in accordance with a signal inputted from the EFM encoder/decoder 14. The magnetic head 17 applies the modulated magnetic field to the disk 18-1.

An MD 18 includes a cartridge 18-2 and a disk 18-1 housed in the cartridge 18-2. The disk 18-1 is driven to be rotated by a spindle motor 19.

Figure 6:
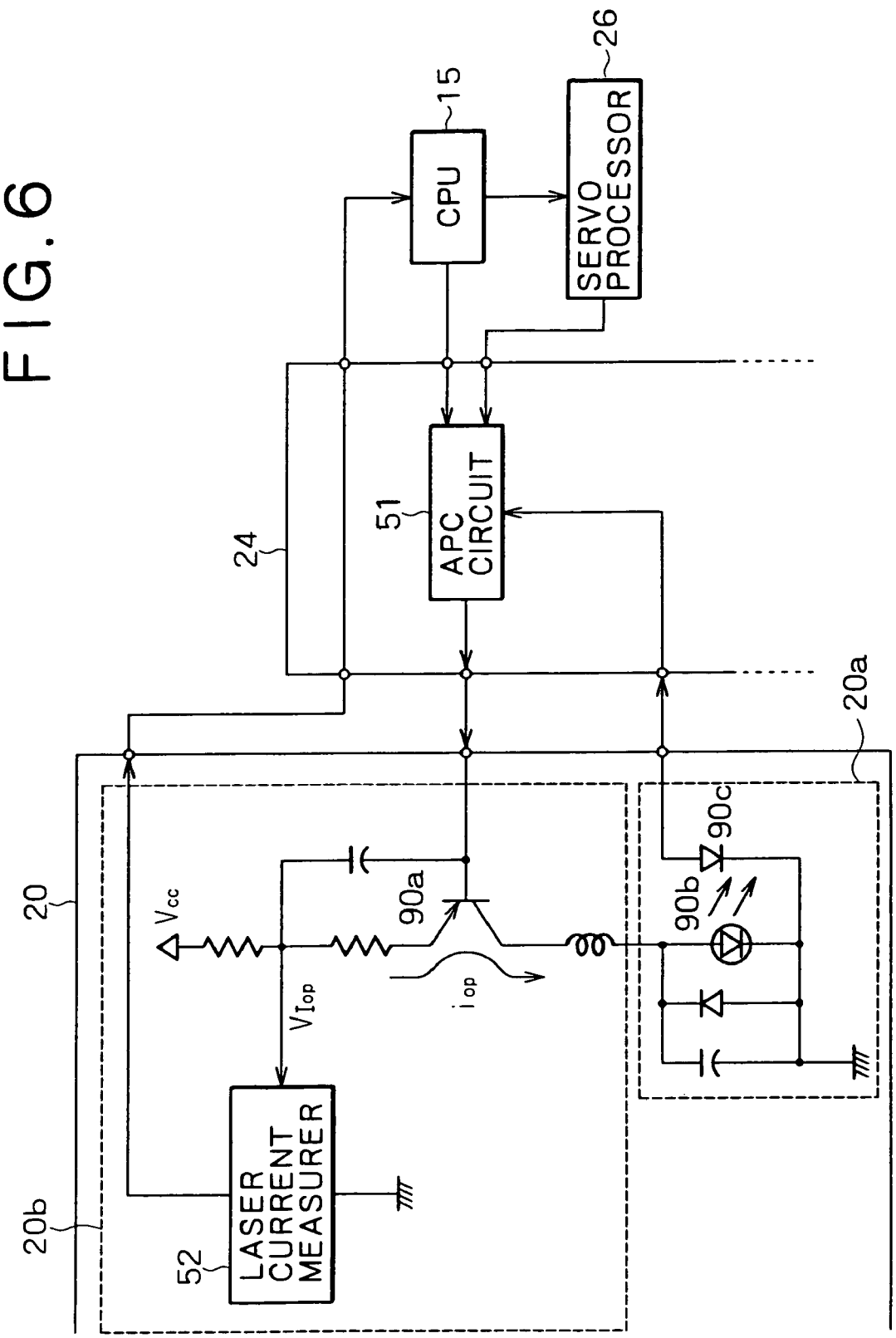
FIG. 6 is a block diagram for explaining a circuit to control emission of a laser beam from the laser diode, and also explaining a laser current measurer.

As shown in FIG. 6, the optical pickup unit 20 is equipped internally with an optical pickup 20a having a laser diode and a detector to detect a reflected beam, and also with a laser driver 20b having a laser diode driving circuit and a laser current measurer. The optical pickup unit 20 emits a laser beam to the disk 18-1 under control of an APC (auto power control) circuit in an RF amplifier 24. When recording the data in the disk 18-1, the laser diode emits a high-level laser beam for heating the recording track on the disk 18-1 up to its Curie temperature. Meanwhile, when reading or reproducing the data from the disk 18-1, the laser diode emits a relatively low-level laser beam for detecting the data from the reflected beam by the electromagnetic Kerr effect. Generally, the laser power required in a data recording mode is eight to ten times the laser power in a data reproduction mode.

The laser beam emitted from the laser diode is irradiated via an objective lens 22 onto the disk 18-1. The objective lens 22 comprises of a cylindrical lens for example, and is so held as to be displaceable by a sled motor 23 and an unshown biaxial actuator in the radial direction of the disk 18-1 and also in the direction toward or away from the disk 18-1, thereby condensing the laser beam emitted from the optical pickup unit 20 onto the recording plane of the disk 18-1. Beam spot positioning information obtained from the RF amplifier 24 is inputted to a servo processor 26 via an A/D converter 25. The servo processor 26 generates, on the basis of the input information, a control signal for positioning the beam spot at a predetermined point on the disk 18-1, and outputs the control signal to a servo driver 21. The servo driver 21 drives the sled motor 23 and the unshown biaxial actuator.

Data address information obtained from the RF amplifier 24 and relevant to the data recorded on the disk 18-1 is inputted to the servo processor 26 via the A/D converter 25. Then the servo processor 26 generates, on the basis of the input information, a control signal for rotating the spindle motor 19 at a predetermined speed of rotation, and outputs the control signal to a spindle driver 27. Subsequently, the spindle driver 27 drives the spindle motor 19 in accordance with this control signal to thereby rotate the disk 18-1.

The data detected from the disk 18-1 by the detector in the optical pickup unit 20 are supplied to the RF amplifier 24. Then the RF amplifier 24 processes the supplied data through calculation to thereby extract the reproduction RF signal, tracking error signal, focus error signal, wobble-recorded absolute position information, address information and so forth.

Such tracking error signal, focus error signal, wobble-recorded absolute position information and address information are outputted to the servo processor 26 via the A/D converter 25. Then the servo processor 26 generates control signals, which are to be delivered to the spindle driver 27 and the servo driver 21, on the basis of the information supplied from the A/D converter 25 and also a track jump command, a seek command and so forth received from the CPU 15, thereby executing focus control and tracking control.

The reproduction RF signal is supplied to the EFM encoder/decoder 14 where EFM demodulation is performed, and thereafter the demodulated data are supplied to the memory controller 12. The demodulated data are processed in the memory controller 12 and are stored temporarily in the DRAM 13, so that the data can be read out by the memory controller 12 at predetermined timing and then are outputted via the data converter 11.

The RF amplifier 24 amplifies the electric signal inputted from a temperature sensor 28, in addition to the various information detected by the detector provided in the optical pickup unit 20, and supplies the amplified signal to the A/D converter 25, or passes the analog signal corresponding to the laser forward current value obtained from a laser current measurer 52 in the optical pickup unit 20, and then delivers such analog signal to an analog input port of the CPU 15.

Figure 2:
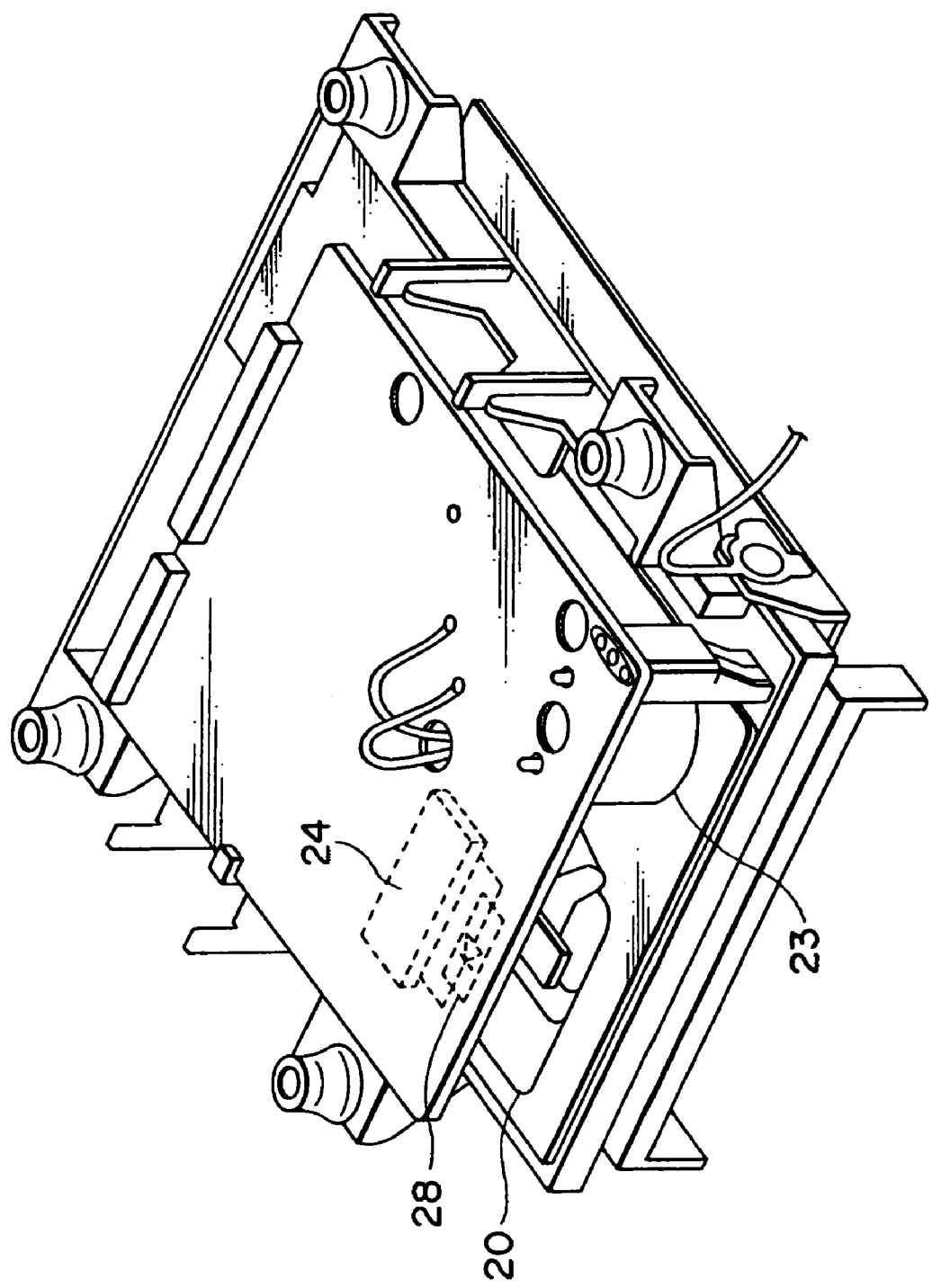
FIG. 2 is a perspective view showing the vicinity of an optical pickup to explain the position of a temperature sensor.

The temperature sensor 28 serves to estimate the data of the measured ambient temperature, and its output is connected to the RF amplifier 24. FIG. 2 is a perspective view showing the structure of the vicinity of the optical pickup unit 20. As shown in this diagram, the temperature sensor 28 is disposed in the vicinity of the optical pickup unit 20. The RF amplifier 24 amplifies the input temperature data and supplies the same to the A/D converter 25. Subsequently the A/D converter 25 converts the input analog signal into digital data, and then outputs the same to the CPU 15.

A supply voltage sensor 30 serves to measure the voltage of a DC power supply for the MD drive 1, and its output is connected to an analog port of the CPU 15.

When the MD drive 1 executes a process of writing the contents data in the MD 18, the CPU 15 controls the process. Therefore the CPU 15 can calculate, by means of a timer unit 31, the accumulated value of the time period during which the laser diode in the optical pickup unit 20 emits its laser beam. The timer unit 31 comprises of two types of timers, i.e., an elapse timer and a laser emission accumulation timer. Each timer starts, stops or resets a counter under control of the CPU 15 so as to calculate the laser emission time.

The CPU 15 outputs the received temperature data, supply voltage data, laser diode forward current data and the calculated laser emission accumulation time to the EEPROM 29 to store such data therein.

Further a drive 32 is also connected to the CPU 15. A magnetic disk 41, an optical disk 42, a magneto-optical disk 43 or a semiconductor memory 44 is loaded in the drive 32 in accordance with each requirement, so that the data can be transferred.

FIG. 3 shows the composition of the data stored in the EEPROM 29.

Temperature 25° C. setting data are necessary for detecting the actual temperature from the temperature data detected by the temperature sensor 28. The details thereof will be described later with reference to FIGS. 9 and 10.

Laser power setting data and laser current-voltage conversion setting data are used for adjusting the output power of the laser diode and also for detecting the forward current value of the laser. Detection of the laser forward current value will be described later with reference to FIGS. 4 to 7.

Servo setting data and servo parameters are required for executing various control actions by the servo driver 21.

Free area is used for recording various necessary data such as prerecorded data prior to shipment from factory, temperature data inputted from the CPU 15, supply voltage data, maintenance data including the forward current data of the laser diode, laser-diode life prediction data calculated from the maintenance data, and other required data.

The data prerecorded prior to shipment from factory include, as will be described later with reference to FIG. 8, an initial value of the laser forward current, a service life multiple of the laser diode, a temperature regarded as a trouble, a supply voltage value regarded as a trouble, and MTTF (mean time to failure) of the laser diode. These data are used to execute an undermentioned processing routine for making a decision as to whether any abnormal state is existent or not in the MD drive 1, or for predicting the service life of the laser diode.

Any temperature regarded as a trouble for example signifies a case where the temperature in the vicinity of the optical pickup unit 20 is close to 60° C. considered to be abnormally high. Any supply voltage regarded as a trouble for example signifies a case where the supply voltage is lower than 11V considered to be insufficient.

Laser current adjust value setting data are used to set the laser forward current for outputting a required laser power to record the data, and are obtained by measuring prior to shipment of the MD drive 1 from factory.

Accumulated time data indicate the accumulated time period of the laser emission calculated by the CPU 15 in a processing routine which will be described later with reference to FIG. 14. A contents control data area is used for recording the data needed to be saved out of the entire control information supplied from the data converter 11 to the CPU 15. An IEEE1394 area is used for recording the information required to control the data transfer from/to an IEEE1394 cable.

Now a detailed explanation will be given on the data prerecorded, prior to shipment of the MD drive 1, in the EEPROM 29 mentioned with reference to FIG. 3.

First, the laser current adjust value setting data will be described below.

In the optical pickup unit 20, the relationship between a laser power P and a temperature t required for recording the data can be experimentally acquired to thereby obtain the following equation.

$$P = Pr\{1-(t-25)K\} \quad (1)$$

In the above equation, K denotes a coefficient for correcting the laser power-temperature, and Pr denotes a reference value of the laser power required at an ambient temperature 25° C.

Figure 4:
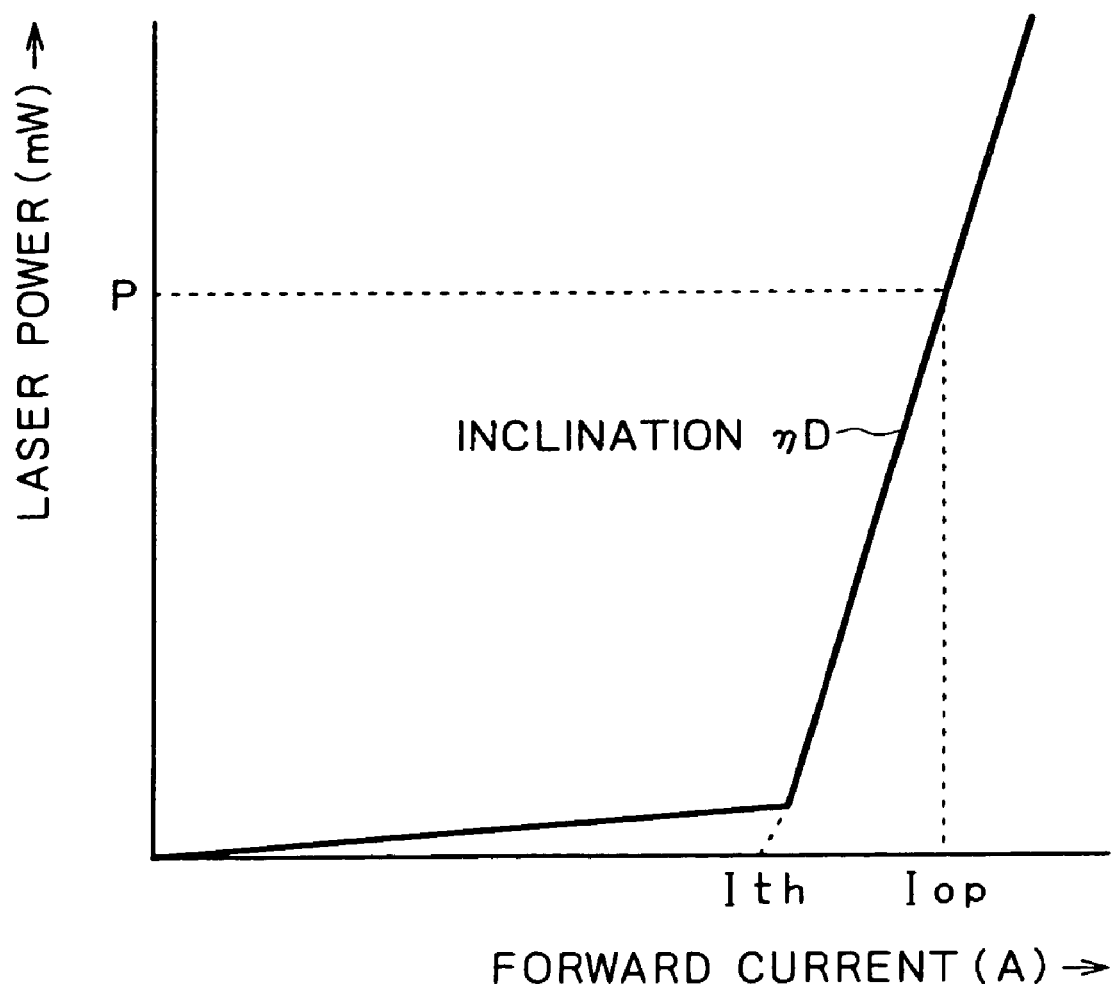
FIG. 4 is a graphic diagram for explaining a forward current in a laser diode and a laser power emitted therefrom.

As shown graphically in FIG. 4, the laser power emitted from the laser diode increases suddenly when the current supplied to the laser diode has exceeded a certain value. Therefore, the relationship between a laser oscillation start current Ith and a differential efficiency ηD can be obtained by measuring the laser power P and the laser forward current Iop at an ambient temperature 25° C. The relationship between the laser oscillation start current Ith and the differential efficiency ηD can be expressed as Eq. (2) shown below.

$$P = \eta D(Iop - Ith) \quad (2)$$

Figure 5:
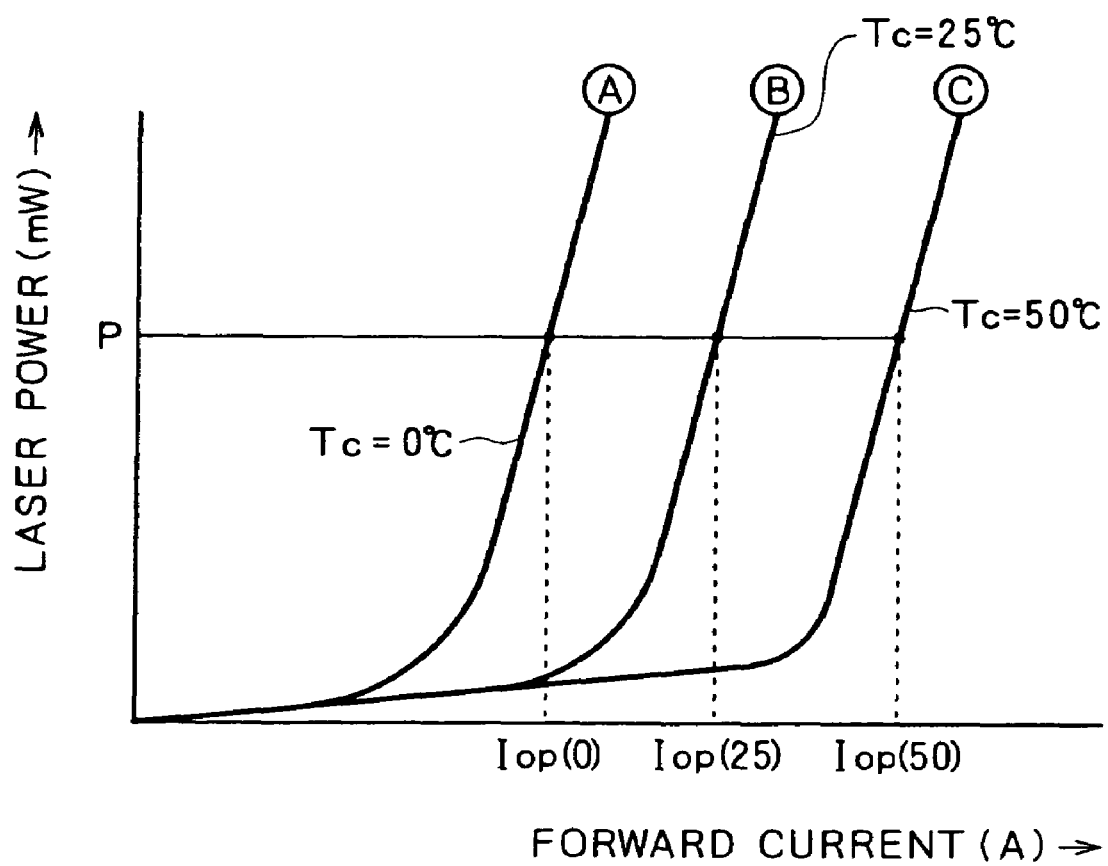
FIG. 5 is a graphic diagram for explaining the temperature in the vicinity of the laser diode and the laser power emitted therefrom.

Further, as shown graphically in FIG. 5, the forward current required for outputting a predetermined laser power is different depending on its ambient temperature. The current value Iop(t) for outputting a required laser power P at an ambient temperature t is expressed as Eq. (3), and the laser forward current corrective value L is expressed as Eq. (4).

$$Iop(t) \approx Iop(25) + L\,Iop(t-25) \quad (3)$$

$$L = (Iop(50) - Iop(0))/50 \quad (4)$$

In Eqs. (3) and (4), Iop(0) denotes a current value necessary for outputting a required laser power P at temperature 0° C.; Iop(25) denotes a current value necessary for outputting a required laser power P at temperature 25° C.; and Iop(50) denotes a current value necessary for outputting a required laser power P at temperature 50° C.

From the above, the relationship between the laser forward current Iop(t) at temperature t° C. and the approximate value Iop(25) of the laser forward current necessary for outputting a required laser power at ambient temperature 25° C. can be expressed as Eq. (5) shown below.

$$Iop(25) = \{Iop(t) - L(t-25)\}/\{1 - K(t-25)\} + Ith \quad (5)$$

Next, an explanation will be given on the laser current-voltage conversion setting data.

FIG. 6 partially shows a laser driving circuit and a current measuring circuit in the optical pickup unit 20 and the RF amplifier 24.

An APC circuit 51 in the RF amplifier 24 receives a control signal from the CPU 15 to control the on/off switching of the laser beam emission, while receiving another control signal from the servo processor 26 to control the emission power, thereby controlling emission of the laser beam from the laser diode 90b in the optical pickup 20a. More specifically, the APC circuit 51 applies a reference voltage to a transistor 90a of a laser driver 20b for controlling the emission power. In this stage, a measured value of the emission power from the laser diode 90b is supplied from a detector diode 90c to the APC circuit 51, so that the laser power is controlled to a required value.

The RF amplifier 24 passes the input analog signal which corresponds to the laser forward current from a laser current measurer 52 in the laser driver 20b, i.e., without processing the input signal, and then outputs the same to the CPU 15.

Figure 7A:
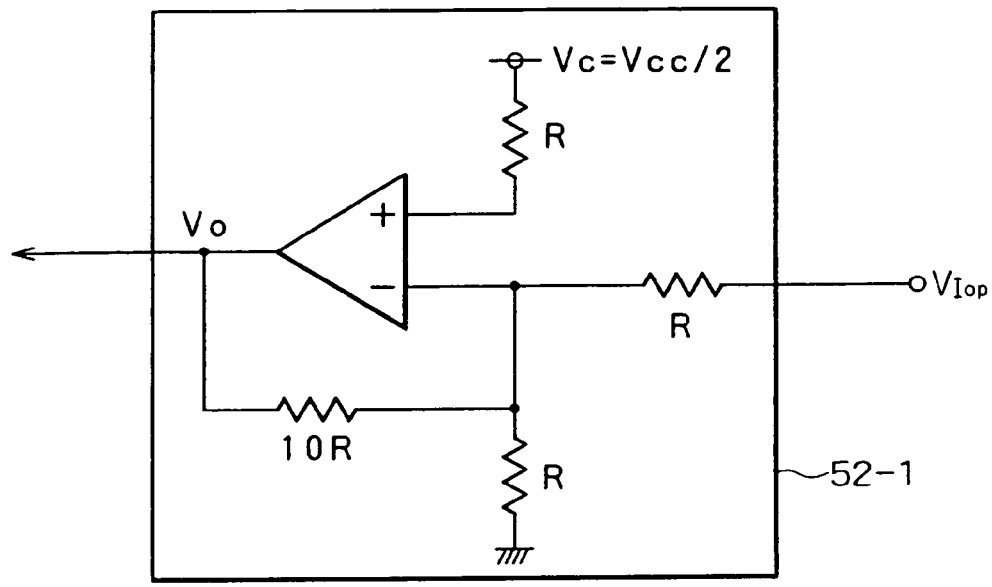
FIGS. 7A and 7B show exemplary circuit configurations of the laser current measurer in FIG. 6.
Figure 7B:
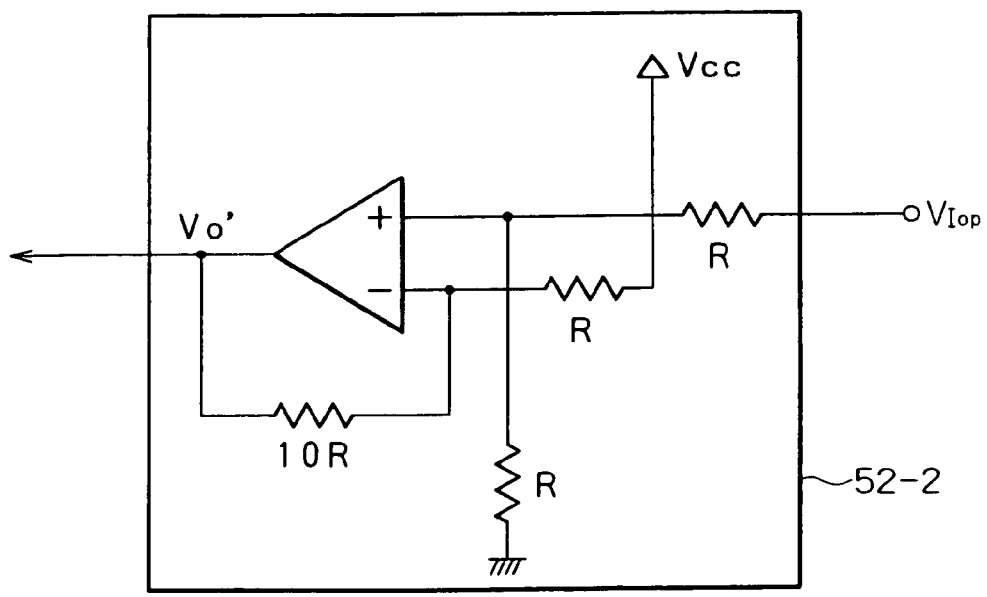

FIGS. 7A and 7B show exemplary circuit configurations of the laser current measurer 52 in FIG. 6.

In a laser current measurer 52-1 of FIG. 7A, when the relationship between an input voltage $V_{Iop}$ to the laser current measurer 52-1 and an output voltage $V_o$ therefrom is such as given in Eq. (6), the CPU 15 is capable of calculating, according to Eq. (7), the current value Iop from the output voltage $V_o$ supplied to the analog input port.

$$V_o = 21V_c - 10V_{Iop} \quad (6)$$

$$Iop = (V_{cc} - V_{Iop})/Ri = (2V_o - V_{cc})/20Ri \quad (7)$$

In the above equations, $V_{cc}$ denotes a reference voltage, and $V_c = \frac{1}{2} V_{cc}$.

In a laser current measurer 52-2 of FIG. 7B, when the relationship between an input voltage $V_{Iop}$ to the laser current measurer 52-2 and an output voltage $V_o$ therefrom is such as given in Eq. (8), the CPU 15 is capable of calculating, according to Eq. (9), the current value Iop from the output voltage $V_o$ supplied to the analog input port.

$$V_o = \frac{1}{2}(11V_{Iop} - 10V_{cc}) \quad (8)$$

$$Iop = (V_{cc} - 2V_o)/11Ri \quad (9)$$

In the above, $V_{cc}$ denotes a reference voltage.

Prior to shipment of the MD drive 1, the laser current-voltage conversion setting value, which conforms with the laser current measurer 52 employed in the optical pickup unit 20 as explained by the use of Eqs. (6) and (7) or Eqs. (8) and (9), is measured at an ambient temperature of 25° C., and the measured value is prerecorded as laser current-voltage conversion setting data in the EEPROM 29 described with reference to FIG. 3.

Now an explanation will be given on the service life multiple of the laser forward current and the initial value thereof.

The output current characteristic of the laser is deteriorated with an increase of the accumulated time of its beam emission. As graphically shown in FIG. 8, the laser diode has such a characteristic that the operating current, which is required for outputting a fixed laser power, e.g., a laser power necessary for storage of the data, rises suddenly after lapse of a certain time with repetition of the beam emission from the laser diode.

Therefore, an emission aging test and so forth are executed by using a sufficient number of laser diodes to measure a multiple of a reference laser forward current Ip corresponding to the laser forward current If which causes a sudden rise of the operating current (i.e., instability of the operation), and the measured value is defined as a service life multiple of the laser forward current. Subsequently the reference laser forward current Ip, i.e., the initial value of the laser forward current, of the relevant laser diode employed in the optical pickup unit 20 of the MD drive 1, is measured and then is prerecorded, together with the service life multiple, in the free area of the EEPROM 29 explained already in connection with FIG. 3.

Next, an explanation will be given on a reference value of the temperature data to be prerecorded in the EEPROM 29 with regard to the vicinity of the optical pickup unit 20.

Figure 9:
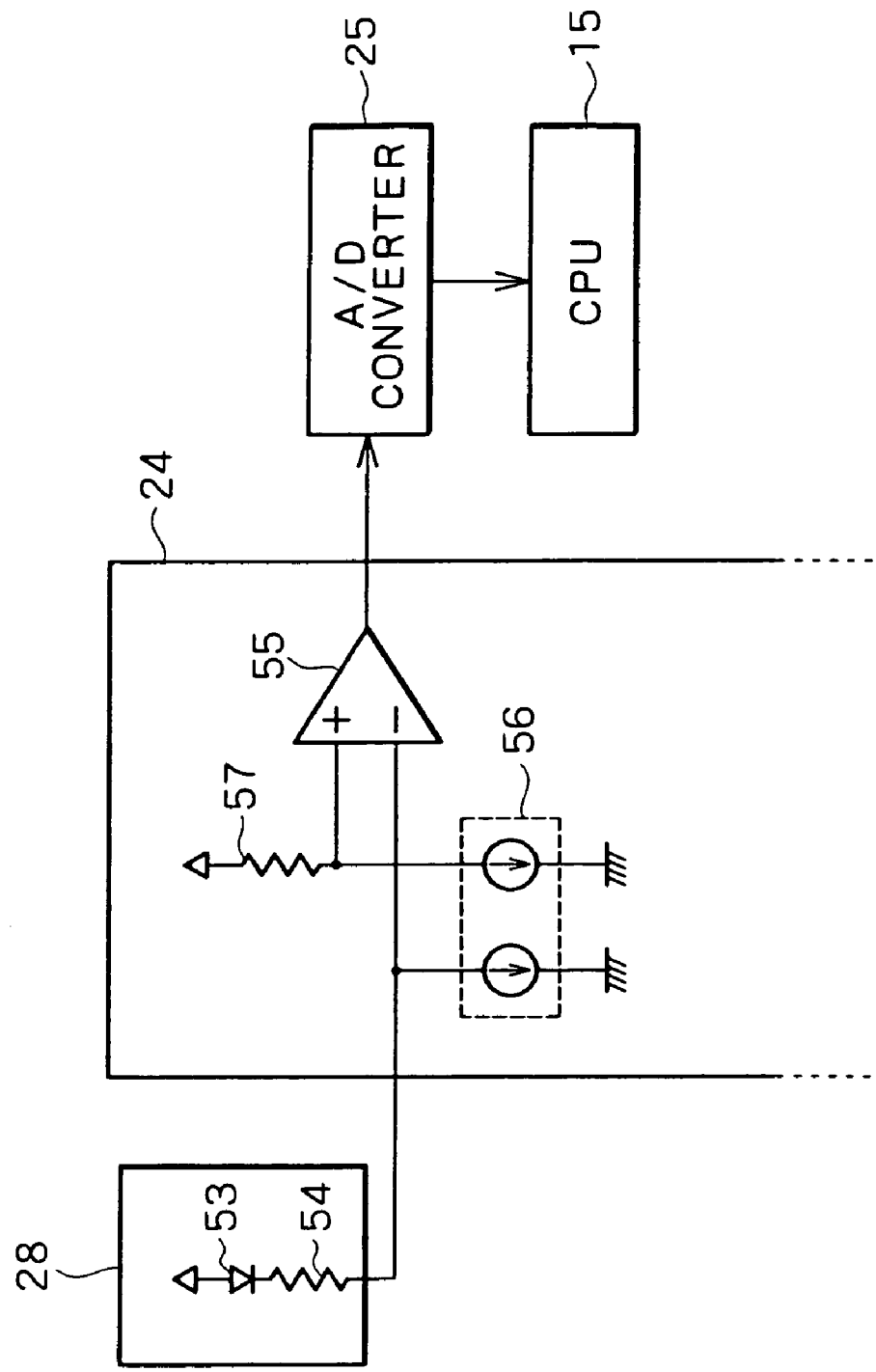
FIG. 9 is a diagram for explaining detection of temperature data.

FIG. 9 is a partial block diagram showing the configuration of a circuit to amplify the output of a temperature sensor 28 in the RF amplifier 24. The temperature sensor 28 comprises a diode 53 and a fixed resistor 54. An output terminal of the temperature sensor 28 is connected to a constant current source 56 of the RF amplifier 24 and a negative terminal of an amplifier 55, while a positive terminal of the amplifier 55 is connected to the constant current source 56 and a fixed resistor 57. That is, the potential difference between the positive terminal and the negative terminal of the amplifier 55 is determined by a change caused in the resistance value of the diode 53 by the temperature. The output of the amplifier 55 is converted into a digital signal by an A/D converter 25 and then is inputted to the CPU 15.

Figure 10:
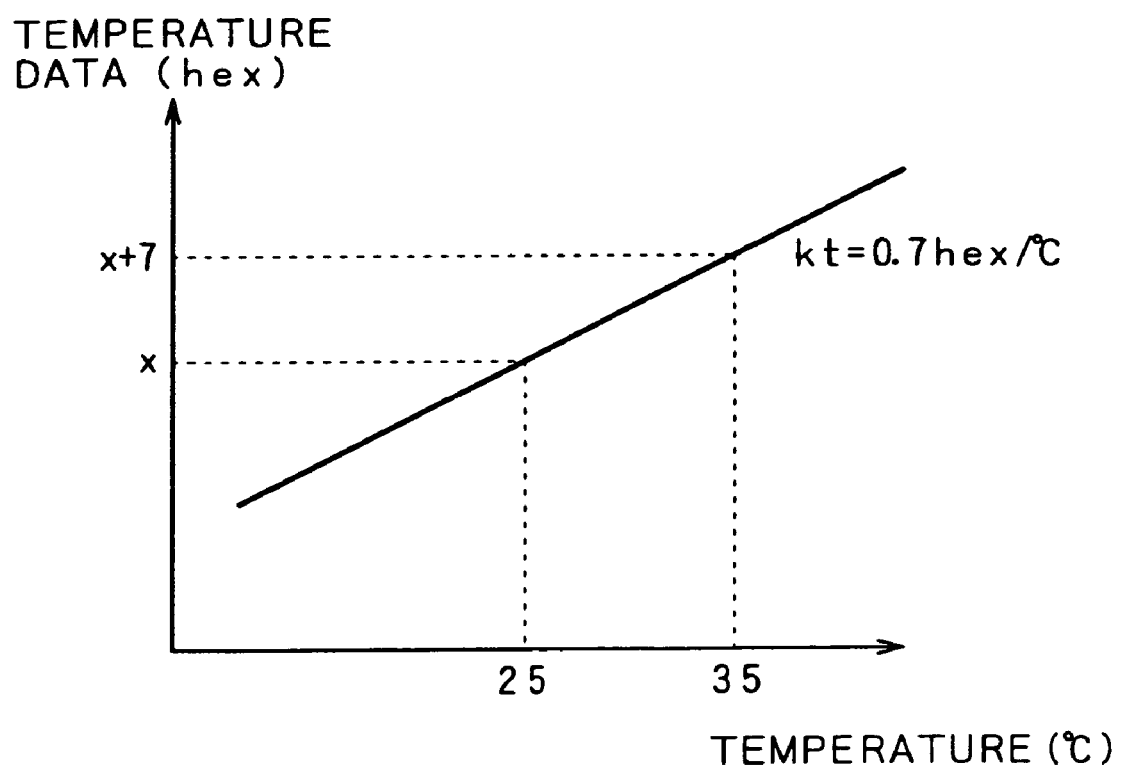
FIG. 10 is a graphic diagram for explaining detection of the temperature data.

The signal inputted to the CPU 15 and the actual temperature in the vicinity of the temperature sensor 28 are changed in proportion, as shown graphically in FIG. 10. Therefore, if the value x of the temperature data inputted to the CPU 15 at a certain temperature (e.g., 25° C. in this embodiment) is prerecorded, prior to shipment from a factory, as a reference value of the temperature data in the free area of the EEPROM 29, the CPU 15 is rendered capable of detecting the temperature by comparing the input temperature data with the reference value x.

Next, an explanation will be given on the reference value of the supply voltage data to be prerecorded in the EEPROM 29.

Figure 11:
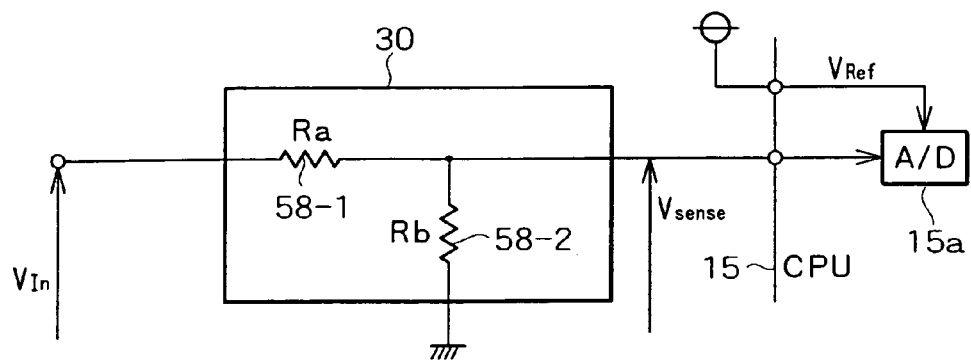
FIG. 11 is a diagram for explaining detection of supply voltage data.
Figure 12:
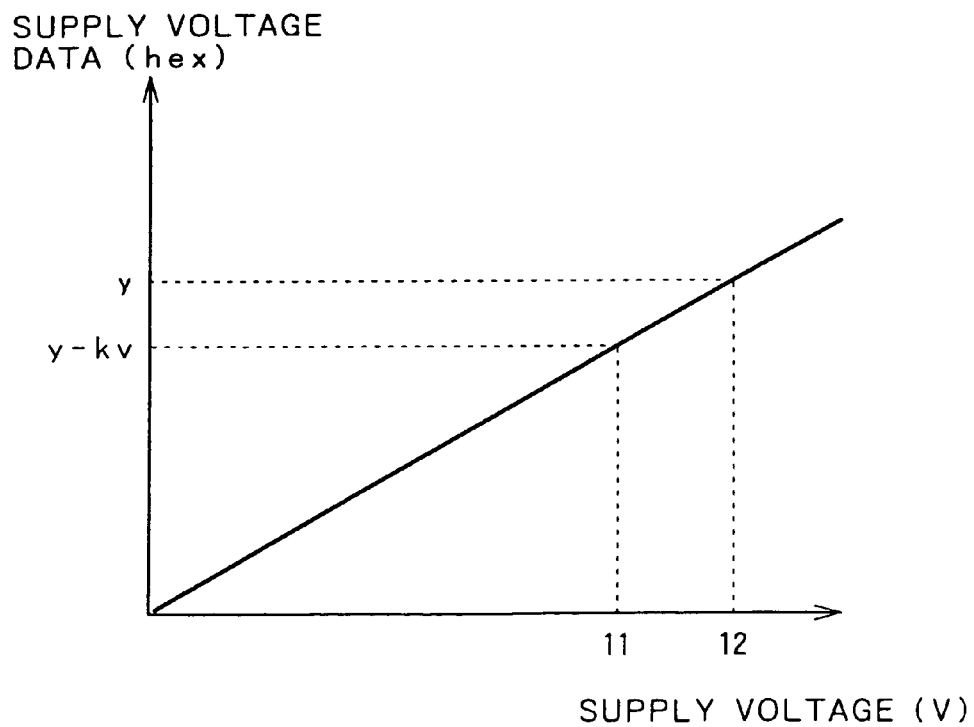
FIG. 12 is a graphic diagram for explaining detection of the supply voltage data.

A supply voltage sensor 30 is connected to the analog input port of the CPU 15. FIG. 11 is a block diagram showing the circuit configuration of the supply voltage sensor 30. The supply voltage sensor 30 comprises a fixed resistor 58-1 having a resistance value Ra and another fixed resistor 58-2 having a resistance value Rb, wherein the supply voltage divided by the fixed resistors 58-1 and 58-2 is outputted to the analog port of the CPU 15. The signal inputted to the analog port of the CPU 15 and the actual supply voltage are changed in proportion, as shown graphically in FIG. 12. Therefore, if the value y of the supply voltage data inputted to the analog port of the CPU 15 at a certain supply voltage (e.g., 12V in this embodiment) is prerecorded, prior to shipment from a factory, as a reference value of the supply voltage data in the free area of the EEPROM 29, the CPU 15 is rendered capable of detecting the supply voltage $V_{in}$ of the system by comparing the input supply voltage data with the reference value y.

It is also possible to calculate the supply voltage $V_{in}$ of the system according to Eq. (10), wherein $V_{ref}$ denotes a reference voltage (e.g., 3.3V) inputted to an A/D converter 15a incorporated in the CPU 15, S denotes a resolution (e.g., 256) of the A/D converter 15a, $d_{hex}$ denotes a value obtained after analog-to-digital conversion, and $V_{sense}$ denotes the voltage value obtained from the output terminal of the supply voltage sensor 30 and inputted to the analog port of the CPU 15.

$$V_{in} = (Ra + Rb)V_{sense}/Rb \quad (10)$$
$$= \{(Ra + Rb)/Rb\} \{d_{hex}/S\} V_{ref}$$

Figure 8:
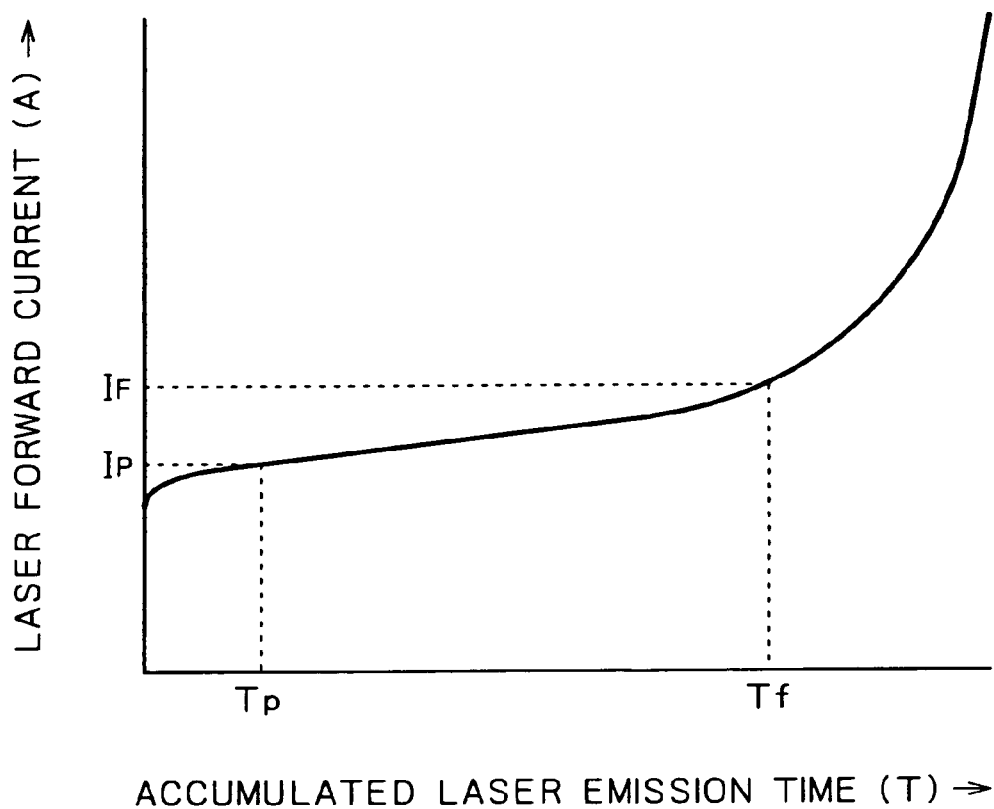
FIG. 8 is a graphic diagram for explaining deterioration in the characteristic of the laser diode.

The accumulated laser emission time Tf, at which the operating current indicates a sudden rise as shown graphically in FIG. 8, has already been found experimentally by the relevant laser diode manufacturer. The accumulated laser emission time Tf corresponds to the MTTF (mean time to failure) of the laser diode. Therefore, if the MTTF is prerecorded in the free area of the EEPROM 29, the CPU 15 is rendered capable of making a decision as to whether the laser diode has arrived at its service life or not by comparing the input accumulated emission time with the prerecorded MTTF, and further capable of calculating the margin up to arrival at the service life by such comparison.

Now a processing routine for detecting the state of the MD drive 1 will be explained below with reference to a flowchart of FIG. 13.

Figure 14:
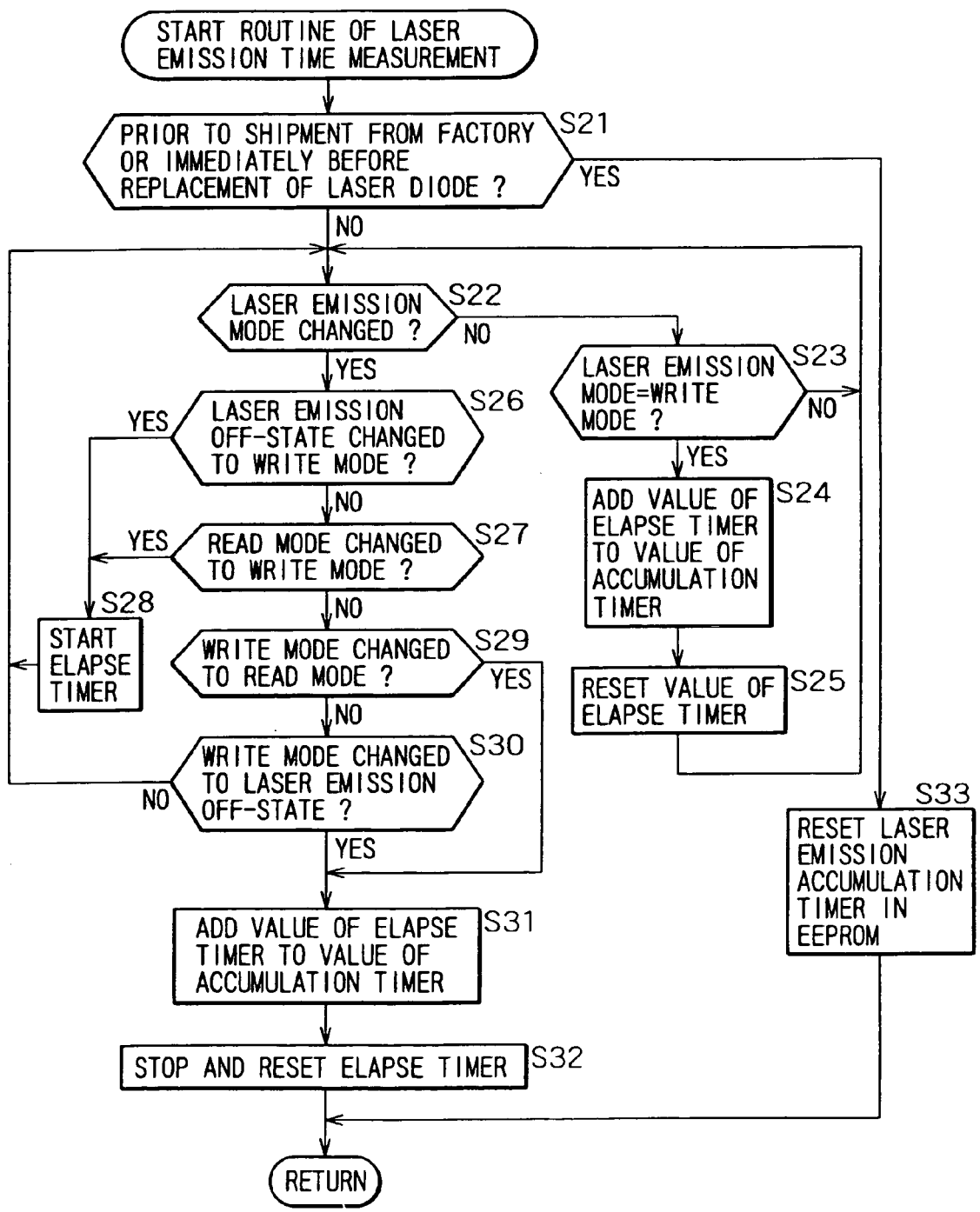
FIG. 14 is a flowchart for explaining a process of measuring a laser emission time.

First, a process of measuring the laser emission time, which will be described later with reference to FIG. 14, is executed at step S1.

The CPU 15 reads the laser emission time accumulated value from the timer 31 at step S2, then reads the supply voltage data from the supply voltage sensor 30 at step S3, and reads, at step S4, the temperature data near the optical pickup unit 20 from the A/D converter 25. Subsequently at step S5, the CPU 15 calculates the supply voltage $V_{in}$ of the system and the temperature near the optical pickup unit 20 from the input voltage data and temperature data on the basis of the reference value x of the temperature data explained by the use of FIG. 10 and also on the basis of the reference value y of the supply voltage data explained by the use of FIG. 12. The supply voltage $V_{in}$ of the system may be calculated according to Eq. (10) on the basis of the voltage value $V_{sense}$ obtained from the output terminal of the supply voltage sensor 30 explained by the use of FIG. 10.

The CPU 15 reads the voltage conversion value of the laser forward current from the EEPROM 29 at step S6, and then calculates the laser forward current, at step S7, from the measured value of the laser current measurer 52, the voltage conversion value of the laser forward current, and the temperature data.

More specifically, in a data recording mode, the CPU 15 receives the measured value of the laser forward current, which becomes a predetermined laser power output required for recording the data, from the laser current measurer 52 of the optical pickup unit 20 via the RF amplifier 24. Subsequently, the CPU 15 calculates the laser forward current Iop(t) at the present temperature t° C. from both the measured value of the laser forward current and the voltage conversion value thereof. Then the CPU 15 calculates the laser forward current Iop(25) at temperature 25° C. according to Eq. (5) on the basis of the temperature t detected in the vicinity of the optical pickup unit 20 and calculated at step S5.

At step S8, the CPU 15 reads the initial value of the laser forward current from the EEPROM 29, and then executes a calculation of: laser forward current value (Iop(25))/laser forward current initial value ($Iop_0(25)$=Ip).

Thus, the CPU 15 is rendered capable of making a decision as to whether the laser diode has arrived at its service life or not by comparing the present laser forward current value/the standard laser forward current value with the service life multiple, and further capable of calculating the margin up to arrival at the service life by such comparison. In this case, the service life of the laser diode is predicted on the basis of the laser forward current Ip which is used as a reference for the laser diode furnished in the relevant MD drive 1 itself, so that a high precision is attainable in prediction of the service life even when some variations are existent in the characteristics of the laser diodes furnished in the respective optical pickup units 20 of the MD drives 1.

Subsequently at step S9, the CPU 15 makes a decision as to whether any abnormal value is existent or not in the entire measured values.

That is, the CPU 15 can make a decision as to whether there is any abnormal value in the measured values by comparison of the MTTF (mean time to failure), the supply voltage reference value, the temperature reference value and the service life multiple prerecorded in the EEPROM 29, with the calculated laser emission accumulated time, the calculated supply voltage value and the measured temperature near the optical pickup unit 20, and also by comparison of the present laser forward current value with the standard laser forward current value.

If the result of the decision at step S9 signifies that there is any abnormal value, the CPU 15 generates, at step S10, a signal indicating the content of such an abnormal state, and then outputs the signal to an unshown external device via the data converter 11.

Regarding the service life of the laser diode judged from the accumulated laser emission time and the laser forward current/standard laser forward current, in case the accumulated laser emission time has become equal to the mean time to failure, or in case the laser forward current/standard laser forward current has reached the service life multiple, the measured value may be considered as an abnormal value, and a signal indicating arrival of the laser diode at its service life may be outputted. Further, in case the difference between the accumulated laser emission time and the mean time to failure has become smaller than a predetermined time, or in case the laser forward current/standard laser forward current has become close to the service life multiple, the measured value may be considered as an abnormal value, and a signal indicating that the laser diode is close to the end of its service life may be generated and outputted.

In this case, it is preferred that a predicted service life of the laser diode be calculated and outputted. The service life of the laser diode may be predicted by calculating the predictive transition curve of the laser forward current value from the past data of the laser forward current value stored in the EEPROM 29, or by regarding the difference between the accumulated laser emission time and the mean time to failure directly as a predicted service life.

For example, the MD drive 1 is incorporated in an MD component stereo, or is connected to a personal computer or the like for use, or is employed in a music distribution system or the like where the drive 1 is supplied with contents data distributed from a host computer via a network. That is, the CPU 15 outputs a signal, which indicates the contents of an abnormal state, to an external device via the data converter 11. Then the output signal is displayed on an unshown display unit for notifying the user of a trouble or the like, or is used in the external device for analysis of the trouble.

If the result of the decision at step S9 signifies that there is no abnormal value, or after completion of the process at step S10, the CPU 15 records, at step S11, the accumulated laser emission time, the laser forward current/laser forward current initial value, and the calculated supply voltage and temperature in the EEPROM 29, and thus the processing routine is completed.

The embodiment described above represents an exemplary case where the accumulated laser emission time, the laser forward current/laser forward current initial value, and the calculated supply voltage and temperature are outputted at each execution of the state detection. However, the processes at step S1 through step S10 may be executed at a fixed time interval and recorded in the EEPROM 29. In response to a command for requesting output of such data from an external information processor for example, the data recorded in the EEPROM 29 may be read and outputted by the CPU 15.

Referring next to a flowchart of FIG. 14, an explanation will be given on the process executed at step S1 in FIG. 13 for measuring the laser emission time.

In the MD drive 1, as described, the laser power required for writing the data in the MD 18 is eight to ten times the power required for reading the data. Therefore, in measuring the laser emission time, as will be explained with reference to FIG. 14, the laser emission time in a write mode only is added to the accumulated laser emission time.

The reason is based on the fact that, since the service life of the laser diode (semiconductor laser) is reduced in inverse proportion to the square of its output beam, the laser emission time in a data write mode, where the output power is high, is measured to consequently realize presumption of the laser life. When it is necessary to achieve more exact measurement of the laser life, the laser emission time in a data read mode may also be measured additionally, and the respective emission times in both of the data write and read modes may be weighted in accordance with the high and low laser powers so that the laser life can be presumed.

At step S21, the CPU 15 makes a decision as to whether the MD drive 1 is prior to shipment from the factory or immediately after replacement of the laser diode. If the result of the decision at step S21 is affirmative to signify that the MD drive 1 is prior to shipment from the factory or immediately after replacement of the laser diode, the processing advances to step S33.

On the other hand, if the result of the decision at step S21 is negative to signify that the MD drive 1 is not prior to shipment from the factory or not immediately after replacement of the laser diode, i.e., the MD drive 1 is in field operation, the CPU 15 makes another decision at step S22 as to whether the laser emission mode has changed or not, in accordance with a control signal sent from the CPU 15 to the APC circuit 51 in the RF amplifier 24. If the result of the decision at step S22 is affirmative to signify a change of the laser emission mode, the processing advances to step S26.

On the other hand, if the result of the decision at step S22 is negative to signify no change of the laser emission mode, the CPU 15 makes a decision at step S23 as to whether the present laser emission mode is a write mode or not. When the result of the decision at step S23 is negative to signify that the present laser emission mode is not a write mode, the processing returns to step S2 since the laser emission mode is either a read mode or a laser emission off-state, and then the subsequent processes are executed repeatedly.

On the other hand, if the result of the decision at step S23 is affirmative to signify that the present laser emission mode is a write mode, the CPU 15 adds, at step S24, the value of the elapse timer in the timer unit 31 to the value of the accumulation timer.

Thereafter the CPU 15 resets the elapsed time of the timer 31 at step S25, then the processing returns to step S2, and the subsequent processes are executed repeatedly.

When the result of the decision at step S22 is affirmative to signify a change of the laser emission mode, the CPU 15 makes another decision at step S26 as to whether the laser emission mode has changed from a laser emission off-state to a write mode. If the result of the decision at step S26 is affirmative to signify a change from a laser emission off-state to a write mode, the processing advances to step S28.

On the other hand, if the result of the decision at step S26 is negative to signify no change from a laser emission off-state to a write mode, the CPU 15 makes a decision at step S27 as to whether the laser emission mode has changed from a read mode to a write mode. When the result of the decision at step S27 is affirmative to signify a change from a read mode to a write mode, the processing advances to step S28.

When the result of the decision at step S26 is affirmative to signify a change from a laser emission off-state to a write mode, or when the result of the decision at step S27 is affirmative to signify a change from a read mode to a write mode, the CPU 15 starts the elapse timer in the timer unit 31 at step S28, then the processing returns to step S2, and the subsequent steps are executed repeatedly.

On the other hand, if the result of the decision at step S27 is negative to signify no change from a read mode to a write mode, the CPU 15 makes a decision at step S29 as to whether the laser emission mode has changed from a write mode to a read mode. When the result of the decision at step S29 is affirmative to signify a change from a write mode to a read mode, the processing advances to step S31.

When the result of the decision at step S29 is negative to signify no change from a write mode to a read mode, the CPU 15 makes a decision at step S30 as to whether the laser emission mode has changed from a write mode to a laser emission off-state. If the result of this decision at step S30 is negative to signify no change from a write mode to a laser emission off-state, the processing returns to step S2, and the subsequent processes are executed repeatedly.

On the other hand, when the result of the decision at step S29 is affirmative to signify a change from a write mode to a read mode, or when the result of the decision at step S30 is affirmative to signify a change from a write mode to a laser emission off-state, the CPU 15 adds, at step S31, the value of the elapse timer of the timer unit 31 to the value of the accumulation timer. Thereafter the CPU 15 stops the elapse timer at step S32 to reset the same, and then the processing advances to step S2 in FIG. 13.

Figure 13:
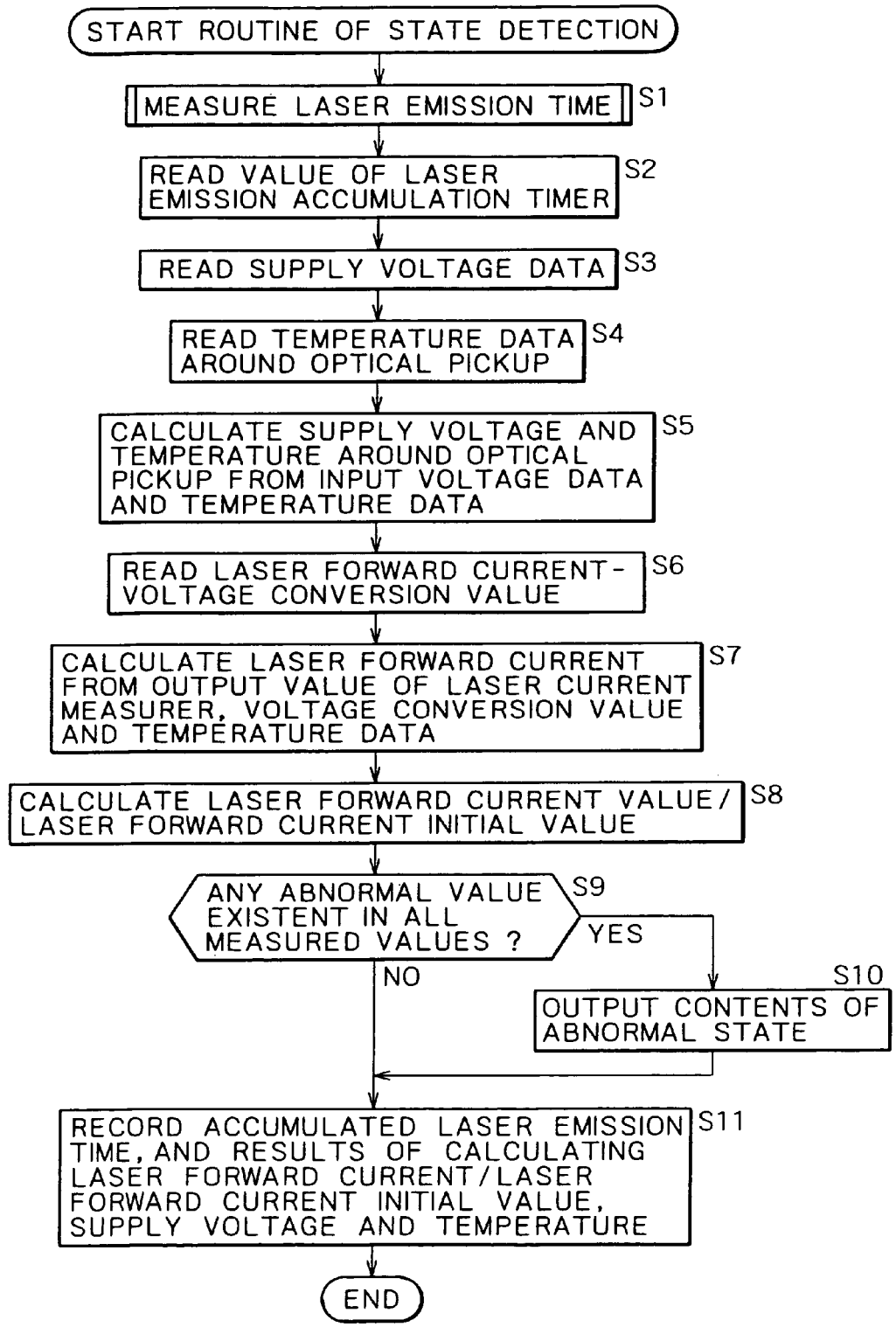
FIG. 13 is a flowchart for explaining a process of detecting a state.

If the result of the decision at step S21 signifies that the MD drive 1 is prior to shipment from the factory or immediately after replacement of the laser diode, the CPU 15 resets, at step S33, the value of the accumulated laser emission time in the EEPROM 29, and then the processing advances to step S2 in FIG. 13.

The process of FIG. 14 for measuring the laser emission time is executed repeatedly in the routine of state detection explained with reference to FIG. 13. That is, during the operation of the MD drive 1, the laser emission time is measured repeatedly.

The processing routine mentioned above represents an exemplary case where the CPU 15 of the MD drive 1 makes a decision to detect any abnormal state by using the maintenance data stored in the EEPROM 29, or compares the present laser forward current/standard laser forward current with the service life multiple, or compares the accumulated emission time with the mean time to failure.

As mentioned, the MD drive 1 is incorporated in an MD component stereo, or is connected to a personal computer or the like for use, or is employed in a music distribution system or the like where the MD drive 1 is supplied with contents data distributed from a host computer via a network. That is, in most cases, the MD drive 1 is actuated under control of a controller such as a CPU in an MD component stereo, or a controller in a personal computer, a host computer or the like.

Therefore, the CPU 15 in the MD drive 1 may be so contrived as to output the supply voltage data, the temperature data and the laser forward current data received respectively from the supply voltage sensor 30, the temperature sensor 28 and the laser voltage measurer 52, and also the maintenance data such as the accumulated laser emission time indicated by the accumulation timer in the timer unit 31, and further the reference data relevant to such maintenance data, to an external control device via the data converter 11, and then the external control device may make a decision as to whether there is any abnormal state, or may compare the present laser forward current/standard laser forward current with the service life multiple, or may compare the accumulated emission time with the mean time to failure.

Figure 15:
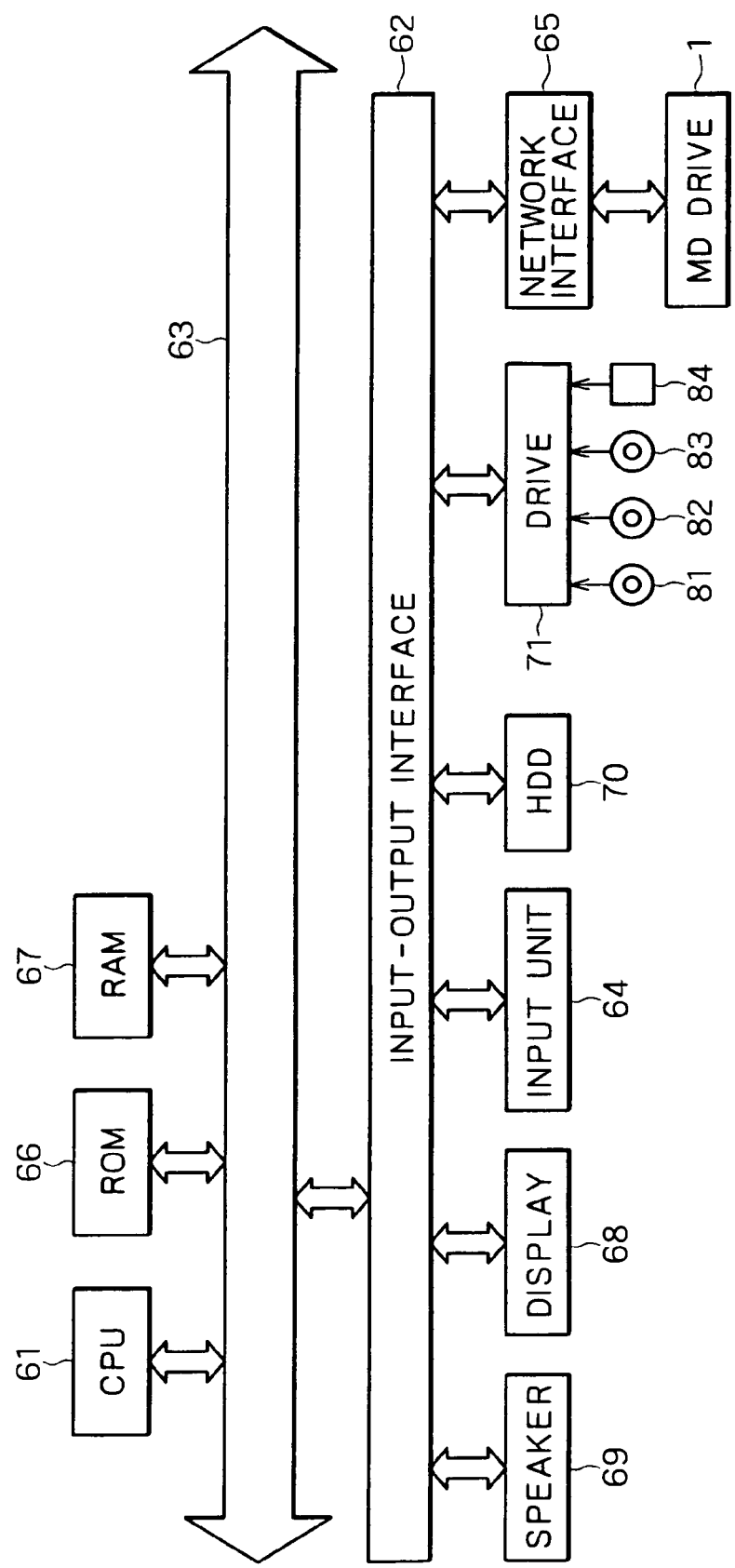
FIG. 15 is a block diagram showing a structural example of a personal computer.

FIG. 15 is a block diagram showing the structure of a personal computer 55, which is connected to the MD drive 1 in FIG. 1, via a network interface by means of an unshown IEEE1394 cable or the like.

A CPU (central processing unit) 61 receives, via an input-output interface 62 and an internal bus 63, signals corresponding to various commands inputted through manipulation of an input unit 64 by the user, or signals inputted via a network interface 65, and executes various processes in response to such signals. The CPU 61 further executes an undermentioned processing routine which will be described later with reference to FIG. 16, so as to detect the state of the MD drive 1 in accordance with the maintenance data inputted from the MD drive 1.

A ROM (read only memory) 66 stores therein a program used by the CPU 61 and also fundamentally fixed data out of entire parameters for computation. A RAM (random access memory) 67 stores therein a program used for execution by the CPU 61 and also parameters changed adequately in such execution. The CPU 61, the ROM 66 and the RAM 67 are connected mutually via the internal bus 63.

The internal bus 63 is connected also to the input-output interface 62. An input unit 64 comprises a keyboard, a mouse and so forth for example, and is manipulated when any of various commands is inputted to the CPU 61. A display 68 comprises of a CRT (cathode ray tube) for example, and displays input information as a text or image. A speaker 69 emits input contents supplied from the MD drive 1 as audio data in accordance with the process executed by the CPU 61. An HDD (hard disk drive) 70 drives a hard disk to record therein a program used by the CPU 61 or data generated by executing the program.

A drive 71 is furnished with a magnetic disk 81, an optical disk 82, a magneto-optical disk 83 and a semiconductor memory 84 when necessary, so as to transfer data from and/or to such media. A network interface 65 is connected to the MD drive 1 via an interface cable such as an IEEE1394 cable so that information is transferred therebetween.

Now a processing routine for detection of state will be described below with reference to a flowchart of FIG. 16.

At steps S41 to S44, the same processes as those at steps S1 to S4 in FIG. 13 are executed.

And at step S45, the same process as that at step S6 in FIG. 13 is executed.

Thereafter at step S46, the CPU 15 in the MD drive 1 transmits the read data, the respective reference values stored previously in the EEPROM 29, and parameters used for detection of trouble, to the personal computer 55 via the data converter 11 and the IEEE1394 cable. The parameters used for trouble detection include, for example, a supply voltage value regarded as a trouble, and a reference temperature (e.g., when the temperature in the vicinity of the optical pickup unit 20 is close to 60° C., it is regarded as an abnormal temperature rise). The supply voltage value decided to be a trouble is such that, in case the supply voltage is lower than 11V for example, it is considered to be insufficient and is regarded as a trouble. A reference temperature is set to 60° C., and when the temperature in the vicinity of the optical pickup unit 20 is close to 60° C., it is regarded as an abnormal temperature rise. Parameters for calculating the predicted service life of the laser include, for example, a service life multiple of the laser forward current, a mean time to failure, and an initial value of the laser forward current explained already with reference to FIG. 8.

At step S47, the CPU 61 in the personal computer 55 receives, via the IEEE1394 cable, the data, the reference values and the various parameters read out by the MD drive 1.

The CPU 61 in the personal computer 55 calculates, at step S48, the supply voltage and the temperature near the optical pickup unit 20 from the input voltage data and temperature data, and also from the reference values thereof. Subsequently the CPU 61 obtains, at step S49, the laser forward current from the laser forward current-voltage converted value and the temperature data, and then calculates, at step S50, the laser forward current value/laser forward current initial value from the laser forward current initial value received at step S47 and also from the laser forward current obtained at step S49.

Thereafter at step S51, the CPU 61 in the personal computer 55 makes a decision as to whether any of the measured values is abnormal or not out of the calculated values obtained at steps S48 and S50, the supply voltage and the temperature received at step S47 and regarded as a trouble, and the service life multiple and the means time to failure.

If the result of the decision at step S51 is affirmative to signify that any of the measured values is abnormal, the CPU 61 in the personal computer 55 outputs the contents of the abnormal state to the display 68 via the internal bus 63 and the input-output interface 62, thereby displaying such contents.

On the other hand, when the result of the decision at step S51 is negative to signify that none of the measured values is abnormal, or after completion of the process at step S52, the CPU 61 in the personal computer 55 outputs, at step S53, the accumulated laser emission time, the laser forward current/laser forward current initial value and the calculated supply voltage and temperature to the HDD 70 via the internal bus 63 and the input-output interface 62, thereby recording the information in the HDD 70 to complete the processing routine.

As mentioned above, the maintenance data may be outputted to and analyzed by an external information processor such as the personal computer 55 instead of being analyzed by the CPU 15 in the MD drive 1, so that even if the CPU 15 in the MD drive 1 has a low processing capability, it is still possible to achieve proper detection of the trouble caused in the MD drive 1 or to predict the service life of the laser diode.

Figure 16:
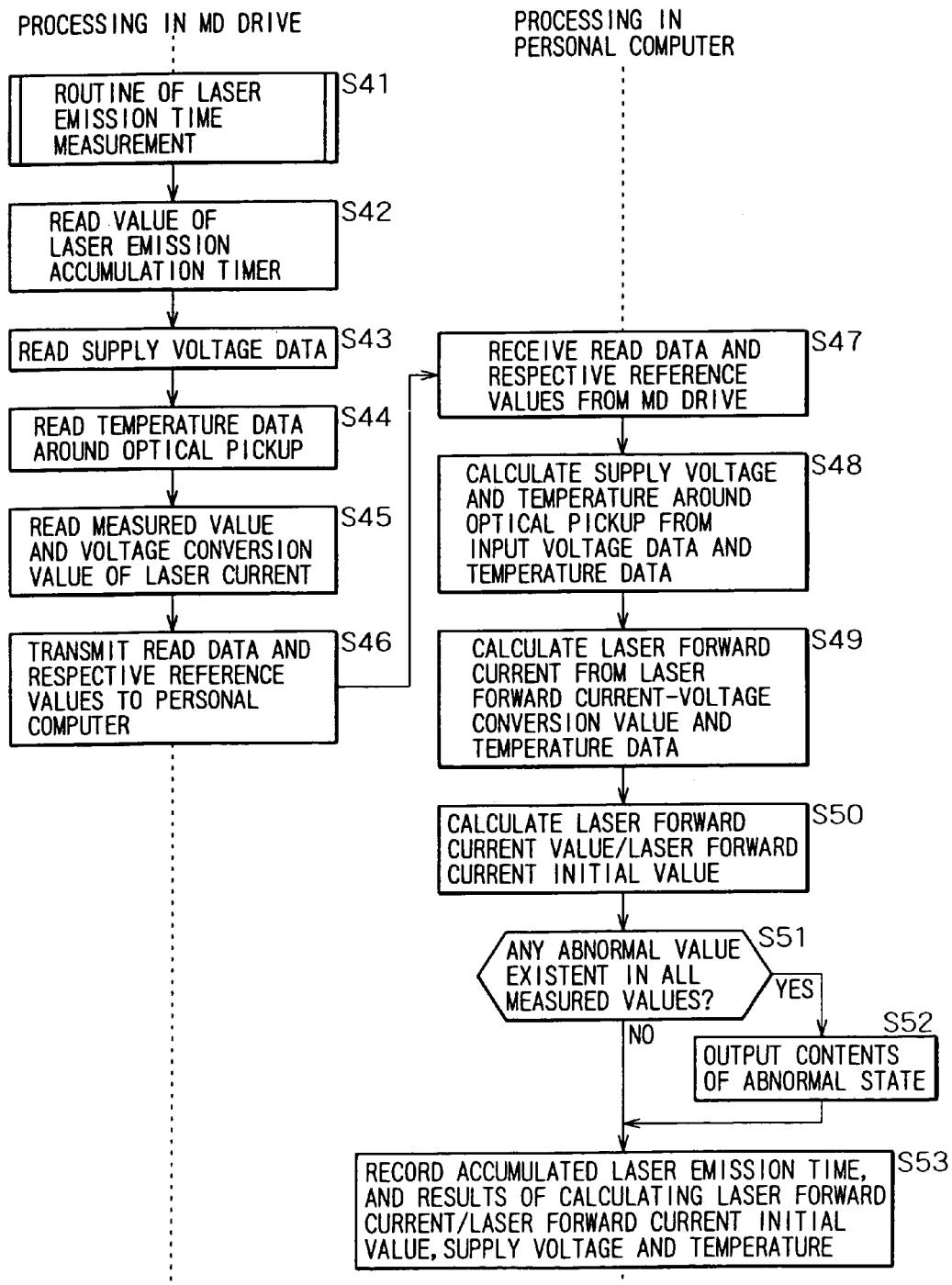
FIG. 16 is a flowchart for explaining a state detection process executed by an MD drive and a personal computer.

Further, in case the MD drive 1 is incorporated in an MD component stereo or is disposed in a music distribution system or the like so as to be supplied with contents data distributed from a host computer via a network, the MD drive 1 may transmit the maintenance data to a controller such as a CPU in an MD component stereo or to a host computer, so that the data can be analyzed by the controller such as the CPU in the MD component stereo or by the host computer in the same manner as the aforementioned routine executed at steps S47 to S53 in FIG. 16, thereby achieving proper detection of the trouble caused in the MD drive 1 or exact prediction of the service life of the laser diode.

The processing routine mentioned above is executable by software as well. Such software can be installed from a recording medium into, e.g., a computer where programs constituting the relevant software are incorporated in its exclusive hardware, or into a general-purpose personal computer which is capable of executing various functions in accordance with various programs installed therein.

This recording medium connotes a package one distributed for providing programs to users separately from the computer, and it comprises, as shown in FIG. 1 or 15, a magnetic disk 41 or 81, an optical disk 42 or 82, a magneto-optical disk 43 or 83, or a semiconductor memory 44 or 84 where programs are recorded. The magnetic disk 81 includes a floppy disk; the optical disk 42 includes a CD-ROM (compact disk-read only memory) and a DVD (digital versatile disk); and the magneto-optical disk 83 includes an MD (mini disk).

In this specification, the steps that describe the program stored in the recording medium are executed in time series in accordance with the mentioned sequence, or may be executed in parallel or individually without being restricted to the time series processing.

Also in this specification, a term "system" connotes the whole equipment comprising a plurality of apparatus and devices.

According to the first recording/reproducing apparatus, the state detection method and the program recorded in the first recording medium of the present invention, the operation is performed by initially measuring the first data, then storing the second data to decide whether any abnormal state is existent or not, subsequently generating, from the first and second data, third data relative to self-maintenance of the apparatus, and outputting the third data thus generated. Therefore, in an MD drive or the like for example, a variety of data to be used as maintenance data may be measured, and parameters required for analysis of the maintenance data may be prerecorded in the MD drive, so that it becomes possible to predict the service life of the semiconductor laser and to detect occurrence of any trouble therein.

According to the second recording/reproducing apparatus, the data output method and the program recorded in the second recording medium of the present invention, the operation is performed by initially measuring the first data, then storing the second data to decide whether any abnormal state is existent or not, and outputting the first and second data to another information processor. Therefore, in an MD drive or the like for example, a variety of data to be used as maintenance data may be measured, and parameters required for analysis of the maintenance data may be prerecorded in the MD drive and outputted to another information processor in a personal computer or the like, so that it becomes possible to predict the service life of the semiconductor laser and to detect occurrence of any trouble in the personal computer or the like.

According to the information processor, the information processing method and the program recorded in the third recording medium of the present invention, the operation is performed by acquiring the first data relative to the state of the recording/reproducing apparatus, then generating, from the first data, second data relative to maintenance of the recording/reproducing apparatus, and outputting the second data thus generated. Therefore, the maintenance data may be measured in an MD drive or the like for example, and parameters required for analysis of such maintenance data may be obtained therein, so that it becomes possible to predict the service life of the semiconductor laser in the MD drive and to detect occurrence of any trouble therein.

What is claimed is:

1. A recording/reproducing apparatus for recording data in a recording medium and reproducing the data therefrom, comprising:
    a laser diode;
    a photo detector configured to detect first data indicative of a first light output value of said laser diode;
    a memory configured to store second data indicative of an initial light output value and other data including a ratio of the first light output value to initial light output value to make a decision as to an abnormal state of the first data;
    a data generating mechanism configured to generate third data relative to a service life of said laser diode on the basis of the first and second data; and
    an output mechanism configured to deliver the third data as an output.

2. The recording/reproducing apparatus according to claim 1, further comprising:
    a current measurement unit configured to measure a forward current value of the laser diode; and
    a decision unit configured to make the decision, the decision unit configured to base the decision on a ratio of the forward current value to an initial forward current value and the ratio of the first light output value to the initial light output value,
    wherein the memory is configured to store the initial forward current value.

3. The recording/reproducing apparatus according to claim 1, further comprising:
    a time measurement unit configured to measure an accumulated emission time of the laser diode; and
    a decision unit configured to make the decision, the decision unit configured to base the decision on the accumulated emission time of the laser diode, a mean time to failure of the laser diode, and the ratio of the first light output value to the initial light output value,
    wherein the memory is configured to store the mean time to failure of the laser diode.

4. The recording/reproducing apparatus according to claim 1, further comprising:
    a temperature measurement unit configured to measure a temperature of the laser diode; and
    a decision unit configured to make the decision, the decision unit configured to base the decision on the temperature of the laser diode, a predetermined temperature, and the ratio of the first light output value to the initial light output value,
    wherein the memory is configured to store the predetermined temperature.

5. A method of detecting the internal state of a recording/reproducing apparatus having a laser diode which records data in a recording medium and/or reproduces the data therefrom, said method comprising the steps for:
    measuring, as first data, the internal state of said recording/reproducing apparatus including accumulating emission time of a laser beam emitted from a laser diode;
    acquiring second data from a memory for detecting that the first data indicate an abnormal value;
    generating, from the first and second data, third data relative to maintenance of said recording/reproducing apparatus including comparing the second data, which represents service life, to the first data; and
    delivering the third data as an output from said recording/reproducing apparatus,
    wherein the first data are measured by accumulating the emission time of the laser beam from said laser diode, and the third data are generated by comparing the second data, with the first data.

6. The method according to claim 5, further comprising:
    measuring a forward current value of the laser diode,
    acquiring an initial forward current value from the memory; and
    making a decision as to a service life of the diode based on a ratio of the forward current value to the initial forward current value and the ratio of the first light output value to the initial light output value.

7. The method according to claim 5, further comprising:
measuring a temperature of the laser diode;
acquiring a predetermined temperature from the memory; and
making a decision as to a service life of the diode based on the temperature of the laser diode, the predetermined temperature, and the ratio of the first light output value to the initial light output value.

8. A recording/reproducing apparatus for recording data in a recording medium and/or reproducing the recorded data therefrom, comprising:
a laser diode configured to emit a laser beam;
a measuring device configured to measure first data that indicates a light output value of the laser beam;
a memory configured to store second data that indicates an initial light output value of the laser beam and ratio of first data to second data which is used for making an output decision regarding service life of the laser diode to make a decision as to any abnormal state of said recording/reproducing apparatus; and
an output mechanism configured to output the first and second data as an output to another information processor.

9. The recording/reproducing apparatus according to claim 8, further comprising:
a current measurement unit configured to measure a forward current value of the laser diode; and
a decision unit configured to make the decision, the decision unit configured to base the decision on a ratio of the forward current value to an initial forward current value and the ratio of the first data to the second data,
wherein the memory is configured to store the initial forward current value.

10. The recording/reproducing apparatus according to claim 8, further comprising:
a time measurement unit configured to measure an accumulated emission time of the laser diode; and
a decision unit configured to make the decision, the decision unit configured to base the decision on the accumulated emission time of the laser diode, a mean time to failure of the laser diode, and the ratio of the first data to the second data,
wherein the memory is configured to store the mean time to failure of the laser diode.

11. The recording/reproducing apparatus according to claim 8, further comprising:
a temperature measurement unit configured to measure a temperature of the laser diode; and
a decision unit configured to make the decision, the decision unit configured to base the decision on the temperature of the laser diode, a predetermined temperature, and the ratio of the first data to the second data,
wherein the memory is configured to store the predetermined temperature.

* * * * *